Jan. 7, 1969   J. L. DAY ET AL   3,420,223
ELECTRODE FOR BIOLOGICAL RECORDING
Filed Dec. 31, 1964   Sheet 1 of 2

Joe L. Day
Maxwell W. Lippitt Jr.
INVENTORS

BY  *[signature]*

ATTORNEY

Jan. 7, 1969     J. L. DAY ET AL     3,420,223
ELECTRODE FOR BIOLOGICAL RECORDING
Filed Dec. 31, 1964     Sheet 2 of 2
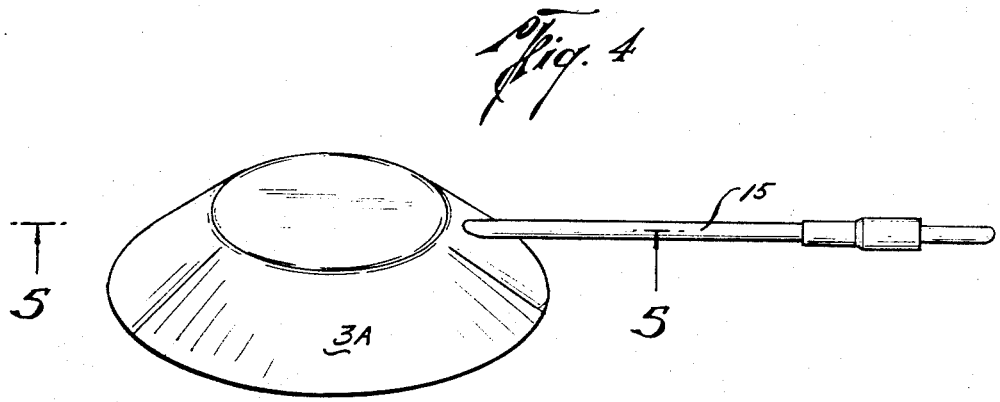
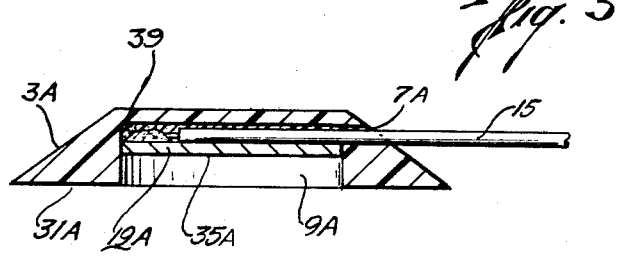
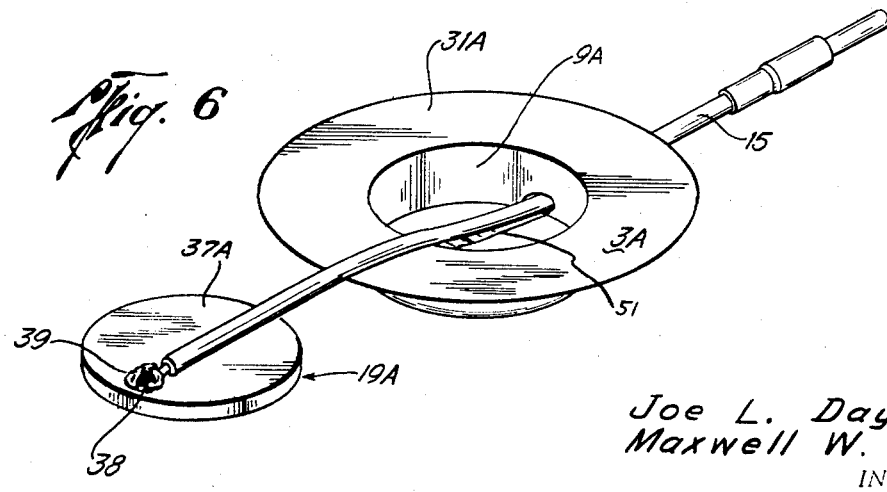
Joe L. Day
Maxwell W. Lippitt Jr.
INVENTORS
BY *[signature]*
ATTORNEY 3,420,223
ELECTRODE FOR BIOLOGICAL RECORDING
Joe L. Day and Maxwell W. Lippitt, Jr., Houston, Tex., assignors to the United States of America as represented by the Administrator of the National Aeronautics and Space Administration
Filed Dec. 31, 1964, Ser. No. 422,864
U.S. Cl. 128—2.06
Int. Cl. A61b 5/04
7 Claims

ABSTRACT OF THE DISCLOSURE

An electrode for detecting potential differences generated by parts of the human body comprising an electrochemically reversible silver chloride anodized silver disk which contacts the skin through an electrode paste on one face of the disk. A lead wire is soldered to the opposite face and this connection is then coated with an epoxy resin to preclude contact of it with the paste in order to prevent spurious electrical activity which would spoil the quality of the signal.

The invention described herein was made by employees of the United States Government and may be manufactured and used by or for the Government for governmental purposes without the payment of any royalties thereon or therefor.

This invention relates to instrumentation for measuring the bioelectrical potentials of living animal bodies and more particularly to an improved electrode for detecting potential differences generated by the heart, brain, and other parts of the human body.

Due to the planned exploration of outer space medical science has been summoned to further investigate the effects on the human body of unusual physical conditions caused by such factors as high speeds, elevated temperatures, and extremely rapid acceleration. In addition to this preexploratory research, it is desirable to monitor certain functions of the human body while an astronaut or pilot is engaged in his normal operational functions. One method of accomplishing these objectives is by utilization of the phenomena of bioelectric potentials. By accurately measuring the minute potential generated by the muscles and organs of a living body, a scientist or physician can accurately translate these electrical parameters into meaningful biological and physiological characteristics.

The use of electrode systems for sensing bioelectric potentials on a living body has long been known to medical science. Both the clinician and medical investigator have been plagued, however, by unsatisfactory electrode devices which produce inconsistent and inaccurate waveforms. Most prior art electrodes have been found unsuitable for extended or repeated usage not only because of their general design which causes localized skin irritation, but also because of deterioration of the electrode proper. Due to the electrochemically irreversible nature of their construction, the use of prior art electrodes on any thing other than a substantially static body introduces severe artifact into waveform readings. Use on active physical subjects is additionally discouraged by reason of the relatively fragile connection of the lead wire to the electrode plate. Further, it has been found that considerable electro-chemical noise results from the manner in which this connection has been made. Therefore, the instant invention is directed to an improved electrode device for use with electrocardiograms, electroencephalograms, impedance pneumograms, and other devices measuring bioelectric potentials of a living body. The present electrode is found to substantially eliminate spurious electrical activity during operation thereby producing accurate and reliable waveforms. More specifically, due to an improved electrode plate consisting of an electro-chemically reversible silver chloride anodized silver disk, the present invention, when used in conjunction with any electrode paste containing sufficient chloride ions, detects the smallest of potentials while minimizing electro-chemical artifact. An additional advantage of the subject invention resides in its durable and highly insulative construction which thereby allows use during active physical movements while simultaneously eliminating sources of electro-chemical noise. Also, due to the improved construction and design of the electrode it may be used over extended periods of time of up to 28 days or more without fear of appreciable deterioration of the electrode or irritation by the wearer.

Additional features of this invention and a more complete understanding of the nature of its use may be had upon examination of the following detailed description, claims, and accompanying drawings wherein like numerals denote like parts in the various views and wherein:

FIG. 4 is a perspective view of a modified electrode in accordance with the invention;

FIG. 5 is a cross section of the electrode of FIG. 4 along the axis 5—5 thereof; and FIG. 6 is a perspective view of the modified electrode in which the housing is displaced from the electrode and rotated 180° so as to show the internal recess in the bottom thereof.

Figure 1:
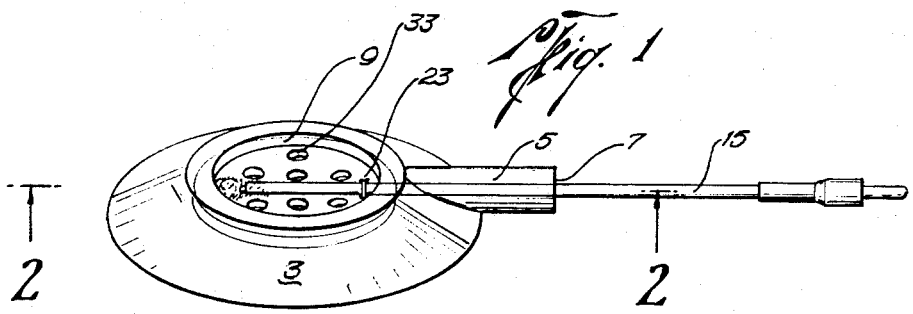
FIG. 1 is a perspective view of the preferred electrode of the invention.

With reference to FIG. 1 there is shown the electrode housing 3 which is made from a generally soft, non-allergenic, non-toxic, and electrically non-conductive material such as silicone rubber (Silastic), natural rubber, neoprene, vinyl, or other similar material. The housing though shown to be of annular, frusto-conical form may take numerous configurations without departing from the essence of the invention noted hereinafter.

Extending from a side of the annular housing and integrally forming a part thereof is a strain relief protuberance 5 having a longitudinal aperture 7 extending therethrough to the central bore 9 which is disposed normally to it in the housing. The strain relief maintains the lead wire 15 in a substantially linear plane in the length which is proximate to its connection with the electrode plate 19. It thereby serves to reduce the possibility of accidental fracture of the soldered connection 38. Since the wire could, however, be rotationally twisted around its own longitudinal axis during active use, a double connection means to the electrode plate is provided by means of a tie-down 23 which is discussed hereinafter. The preferred housing additionally embodies a circumferential groove 25 which extends around bore 9 of the housing at a point which is approximately midway between its upper surface 27 and its lower surface 31.

Figure 2:
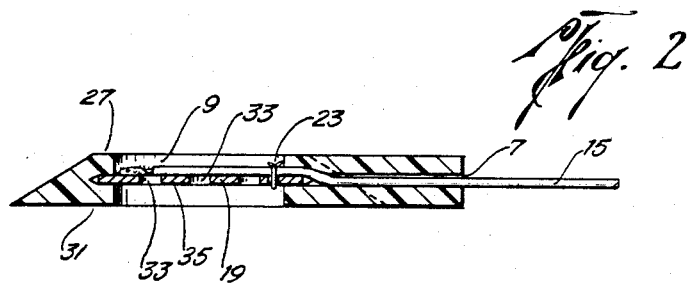
FIG. 2 is a cross section of the electrode of FIG. 1 along the axis 2—2 thereof.
Figure 3:
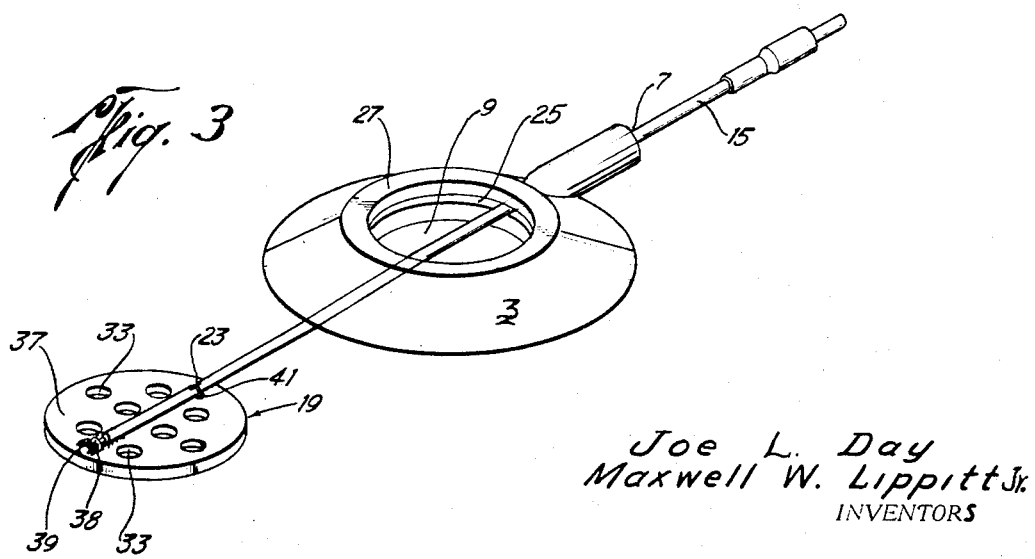
FIG. 3 is a perspective view of the electrode of FIG. 1 having the electrode disk displaced from the housing so as to show the interior thereof.

Disposed within the groove is the electrode plate or disk 19 which is made from jeweler's fine grade silver. Although the disk may vary in size in accordance with the size of the housing, it may generally be approximately .75 inch in diameter and approximately .030 inch thick. The disk is provided with a plurality of holes as best shown at 33 (FIG. 3) extending therethrough the function of which is to permit electrode paste, when applied to the bottom surface 35 of the disk, to seep therethrough so as to contact the upper surface 37 also. This is done in order to reduce the current density, it being known that a reduction in the current density reduces the rate of deterioration caused by electrolytic processes over extended periods of time. The disk is attached to the lead wire 15 by means of a soldered connection 38 proximate to the edge thereof. The wire is arranged to extend across a major dimension of the disk to the opposite side where it is attached by means of a second more flexible means such as tie-down 23 which extends around the wire and through each of two holes 41 on either side thereof. These holes may be made with a No. 58 drill whereas apertures 33 should be somewhat larger. It is thus seen that by soldering the wire to the disk at a point opposite or removed from the tie-down connection that movement of the wire with respect to the disk at the soldered point is substantially eliminated except for movement which could be transmitted by rotational twisting of the wire itself. It is found however that this latter motion is substantially reduced because of the resistance to twisting effected by the relatively small diameter of the strain relief longitudinal aperture 7. It may be noted in this regard that this aperture, shown in FIG. 2 is somewhat exaggerated in size but that in normal construction the walls of the aperture will be in intimate contact with the wire throughout. The anodized electrode plate 19, to which the wire is soldered, is prepared in accordance with the following procedure.

After the plate or disk is cut to the desired size, cleaned, sanded, and washed in deionized water, the soldered connection is cleaned with an appropriate solvent such as an alcohol and then coated with an epoxy resin 39 or other effective insulation which will preclude contact of it with the plate. Care must be taken to cover all of the compound metal junction formed by the solder wire and electrode plate since if any is left exposed there will occur, by reason of the electrolytic nature of the paste, a battery action which will produce spurious electrical activity, thus spoiling the signal quality. Properly applied insulation effectively precludes this possibility. After the epoxy has cured, the disk is degreased and washed thoroughly again with deionized water. It is then placed in a cell with a silver chloride and is anodized in an 0.10 normal sodium chloride solution for 20 minutes to a current density of approximately 3 milliamps per square centimeter this being based on the total surface of the active electrode area. A smooth, even coat of silver chloride is thus produced on the silver disk. It is important that the disk not be touched with fingers or metal thereafter. The load wire 15, discussed above, is then dressed down flat across the major dimension of the plate and is secured by means of a tie-down knot, also as explained above. A drop of cement is applied to the knot to maintain it.

Electrode plates fabricated in accordance with the above procedure may be re-used repeatedly and are found by reason of their silver chloride coating to be electrochemically reversible when used in conjunction with an electrode paste containing sufficient chloride ions to permit active interchange between both the electrode plate and paste. Although various electrode pastes may be used in conjunction with the subject invention, the paste described in copending application Ser. No. 422,088, filed Dec. 29, 1964, now abandoned, also identified as NASA Case No. 1181, has been found particularly suitable for uses described herein. The above ionic interchange is based on the well-known Nernst effect in which a metal, anodized with one of its slightly soluble salts, (in this case silver chloride), in contact with a solution containing the anion (chloride) of the anodized coating, sets up a reaction in which the slightly soluble salt provides a stable concentration of silver ions at the interface, as well as saturation of the electrolyte. This in turn permits the passage of current carried by the chloride ion, which is the common ion of the silver chloride-sodium system. The silver ions are provided by the silver metal which anodically forms the silver chloride. The silver chloride permits passage of current between similar electrodes by the above process, thus greatly minimizing polarization and creating a reversible electrode. In this manner the electrochemical noise normally associated with prior art electrodes is substantially eliminated even when the electrode is used on a physically active subject.

Although the electrode structure described above (with respect to FIGS. 1 thru 3) embodies a housing of flexible material, it is readily apparent that the silver-silver chloride electrode disk may, with feasibility be utilized in other types of housings. Thus in FIGS. 4 thru 6 there is shown a housing 3A of methylmethacrylcate (Lucite) which has a cylindrical recess 9A extending into the housing from the bottom surface 31A thereof. Since the housing 3A is not open at both ends the disk 19A, as best shown in FIG. 6, is not drilled with a plurality of holes therein, since to do so would preclude effective cleaning of the top surface 37A of the electrode. The disk however is constructed, from its electro-chemical aspect, in the same manner as the electrode disk of FIG. 1 described above. As shown in FIG. 5, the lead wire 15 extends through a housing aperture 7A-1 and is laid across a major dimension of the disk in groove 51 to an edge thereof which opposes the entry edge. The soldering and epoxy coating of the lead wire are accomplished in the same manner as previously explained. A tie-down connection is not necessary because the inflexible material from which the housing is made precludes bending of the lead wire at its entry into the aperture 7A. After the wire is threaded through the aperture and into groove 51 in the housing at the base of recess 9 therein, the electrode disk is affixed in the housing with an epoxy resin 39 or other suitable adhesive in permanent manner.

The electrodes fabricated in accordance with the preceding description may undergo continuous and repeated use without suffering structural failures of the lead wire. Although the reversibility of the electrode plate deteriorates, thus causing spurious potential rise over a period of time, the electrodes of the type initially described may be disassembled, cleaned, and reanodized as desired, while the electrode of FIGS. 4 thru 6 may be cleaned and anodized without disassembling.

In applying the electrode of the subject invention to the skin, a piece of tape (or other adhesive) having adhesive on both sides and conforming to the shape of the bottom surface 31 of the electrode is applied thereto. After the tape is applied to the electrode, the protective covering on the remaining adhesive surface is left intact until the recess of the electrode is filled with electrode paste. The skin is then lightly swabbed with acetone to remove skin oils and desiccate the skin so as to improve the adhesion. After removing the protective covering on the tape, the electrode is firmly pressed to the skin. In using the electrode of FIG. 1 the area within the housing above plate 19 is filled with electrode paste to a point just below top surface 27 of the housing. A small piece of silicone tape is then applied across the area so as to retain the paste therein. The upper area should not be overfilled since to do so would preclude effective adhesion of the tape. An additional piece of appropriate surgical tape approximately 3 inches by 3 inches is then applied across the entire electrode so as to prevent frictional contact of it against the clothing of the subject. The electrode of FIG. 4 is applied in the same manner as described above except for the elimination of the electrode paste in the upper surface and the small piece of silicone tape thereover.

While there have been shown, described, and pointed out in two different embodiments the fundamental novel features of the invention, it should be understood that various omissions, substitutions, or changes in the shape, electrode plate-housing tie-down connection means, and other details of the device illustrated and its operation may be made by those skilled in the art without departing from the spirit and scope of the invention as described herein and in the following claims.

Having thus described the invention, what is claimed as new and is desired to be secured by Letters Patent is:

1. A voltage detection device for use on a living animal body during active physical exertion comprising:
- a housing of flexible material having a lower body contacting surface and an upper surface;
- a bore having internal walls which extend through the housing to each of said surfaces;
- said walls having electrode support means thereon approximately midway between said lower and upper surfaces;
- an electrically conductive metal plate fixedly engaged by said electrode support means;
- an electrical lead having an end portion disposed across the surface of said metal plate and in abutting relation thereto;
- first means fusing the end of said electrical lead to the plate adjacent a first edge portion thereof, and second means fixedly holding said lead to said plate adjacent an edge portion remote from said first edge portion so as to thereby preclude movement of the lead at said first edge portion; and
- an insulating medium covering said first connection means so as to preclude introduction of extraneous electrical signals into the lead.

2. The voltage detection device as recited in claim 1 wherein said electrically conductive metal plate is made of a fine grade silver sheet material having a coating of silver chloride thereon.

3. The voltage detection device as recited in claim 2 wherein said insulating means comprises a coating of epoxy resin.

4. The voltage detection device as recited in claim 3 wherein said second means comprises a string affixing the lead to the plate.

5. The voltage detection device as recited in claim 4 wherein said electrode plate has a plurality of holes therethrough for allowing an electrolytic paste to be freely applied to both surfaces thereof.

6. The voltage detection device as recited in claim 1 wherein said electrode plate has a plurality of holes therethrough for allowing an electrolytic paste to be freely applied to both surfaces thereof.

7. The voltage detection device as recited in claim 1 wherein said insulating means comprises a coating of epoxy resin.

References Cited

UNITED STATES PATENTS

| | | | |
|---|---|---|---|
| 2,943,628 | 7/1960 | Howell | 128—418 |
| 3,085,577 | 4/1963 | Berman et al. | 128—218 |
| 3,170,459 | 2/1965 | Phipps et al. | 128—2.06 |
| 3,216,424 | 11/1965 | Chardock | 128—418 |
| 3,295,515 | 1/1967 | Kahn | 128—2.06 |

OTHER REFERENCES

German Auslegeschrift, application No. 1,108,820, 7/15/1961.

WILLIAM E. KAMM, *Primary Examiner.*